T. S. BOURSHETT.
Car Wheel.

No. 6,863.

Patented Nov. 13, 1849.

UNITED STATES PATENT OFFICE.

THOMAS S. BOURSHETT, OF LITTLE FALLS, NEW YORK.

CAST-IRON CAR-WHEEL.

Specification of Letters Patent No. 6,863, dated November 13, 1849.

*To all whom it may concern:*

Be it known that I, THOMAS S. BOURSHETT, of Little Falls, in the county of Herkimer and State of New York, have invented a new and useful Improvement in Railroad-Car Wheels, which is described as follows, reference being had to the annexed drawings of the same, making part of this specification.

Figure 1:
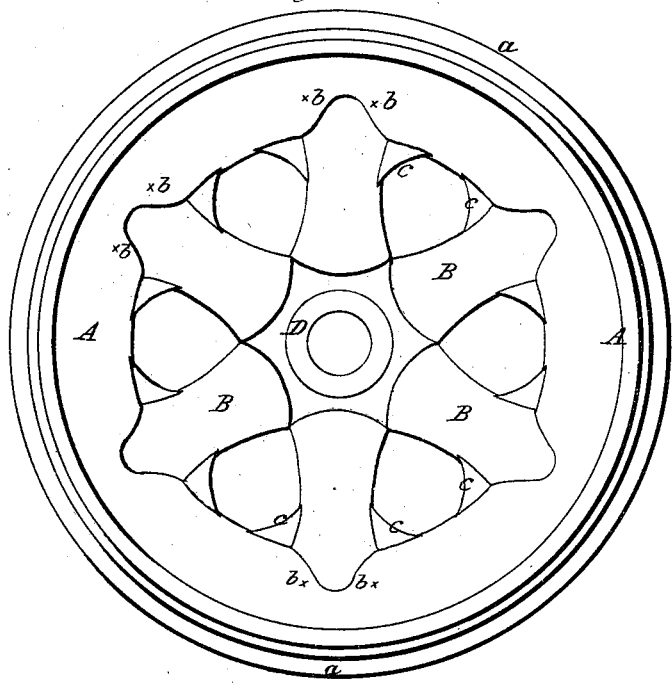
Figure 2:
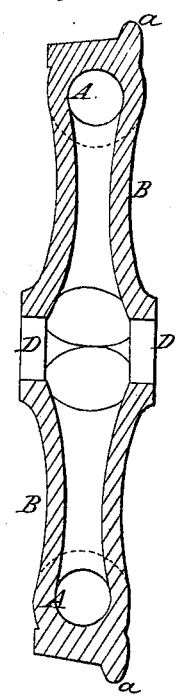
Figure 3:
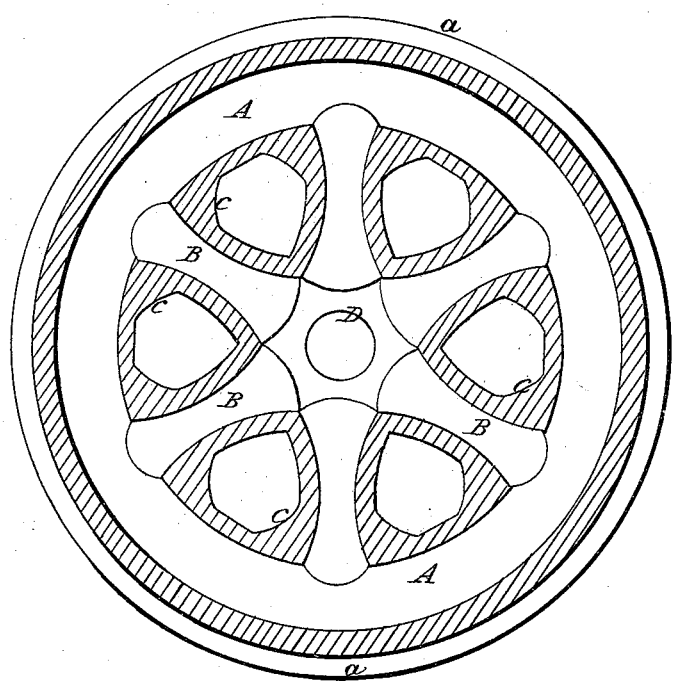

Figure 1 is a side elevation of the improved wheel. Fig. 2 is a vertical cross section of ditto. Fig. 3 is a vertical longitudinal section of ditto.

Similar letters in the figures refer to corresponding parts.

The nature of this invention and improvement consists in casting the rim, arms, and enlarged part of the wheel surrounding the hub, hollow of one uniform thickness, except where the parts join each other, and of a curved form, in such a manner as to allow each of the curved parts of the wheel to yield to the shrinkage, in case the other parts become fixed or cooled first, and the several parts to accommodate themselves to each other without danger of breakage in cooling; the wheel thus formed being light and strong, and capable of bearing without injury the straining, racking, and twisting, usually exerted on car wheels.

To enable others skilled in the art to make and use my invention, I will proceed to describe the manner of forming the same.

A is the rim of the wheel cast hollow, and provided with the usual formed tread and flanch (a) on the outer periphery, and curved on its inner part to form, when viewed in cross section, a semicircle, as represented in Fig. 2, so as to allow all its parts to yield alike when cooling, to compensate for the shrinkage thereby occasioned.

B are the arms of the wheel likewise cast hollow, and round, and made curved on their sides from the rim A to the hub in the form of an arc of a circle, the thickness of metal of which they are composed being made of one uniform size throughout, except at the parts where they join the rim and hub of the wheel, at both of which parts their thickness is increased to insure strength.

C are curved flanges or ribs cast on the outer extremities of the arms B, and inner part of the rim A, where they join each other for the purpose of strengthening their union.

D is the hub of the wheel also cast hollow, and flaring outward from the arms B on both sides, somewhat after the manner of a trumpet mouth and made of a thicker body of metal than the other parts of the wheel, to sustain the increased strain exerted on the same, and to form sufficient bearing surface on the shaft or axle, which is passed through the center of the same, and to which the wheel is secured in the usual or most approved manner.

In viewing the wheel from the side as in Fig. 1 the sides of the arms will correspond with arcs of circles, scribed from points (b) around the rim of the wheel, and in viewing the same in cross section the core of the rim A will form a circle, and the inner part of its outer surface a semicircle, scribed from the same center, and the inner flaring ends of the arms B where they join the hub will resemble the mouth of a speaking trumpet.

From a perusal of the foregoing and reference to the drawings, it will be readily perceived that all the parts where shrinkage takes place in cooling, being made curved and capable of yielding, they will accommodate themselves to each other without danger of breakage arising from one part cooling before the other, as would be the case were the contracting parts straight. For instance, suppose that in casting a circular rim with straight arms, either of the parts were to become cool and fixed before the other—say the rim before the arms—the shrinkage of the arms would cause some of them to break; but if the arms were of the curved and hollow form represented in the drawings, the shrinkage would straighten them sufficient to accommodate them to the amount of contraction. As it is necessary to chill the tread of car wheels, and the sudden chilling contracts the metal in contact with the chill, the importance of forming the arms and hub of the curved shape represented, so as to cause them to yield and accommodate themselves to each other, will be apparent. A wheel cast in this form will moreover be lighter and stronger than those cast in the usual shape, all the pressure exerted on it being caused to act on curved surfaces, on the principle of the arch and therefore the straining and twisting to which car wheels are subjected, will not be so liable to break or otherwise injure it.

What I claim as my invention and desire to secure by Letters Patent, is,

The combination of the curved hollow arms B, with the hollow rim A, made semi-circular on its inner part, and hollow curved hub D, enlarged and forming a continuation of the flaring of the inner ends of the arms, for causing all the parts of the wheel to accommodate themselves to each other in shrinking or cooling, substantially in the manner, and for the purpose herein set forth.

THOMAS S. BOURSHETT.

Witnesses:
M. E. FULLER,
BENJAMIN SEVERSON.